(12) United States Patent
Holt et al.

(10) Patent No.: US 8,047,425 B2
(45) Date of Patent: Nov. 1, 2011

(54) STORED-VALUE PRODUCT WITH HOUSED ARTICLE

(75) Inventors: Brian R. Holt, Minneapolis, MN (US); Heidi L. Rose, Minneapolis, MN (US); Erin M. Borkowski, Andover, MN (US); Allison Schelitzche, Bloomington, MN (US); Timothy P. Clegg, Manhattan Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 1230 days.

(21) Appl. No.: 11/697,271

(22) Filed: Apr. 5, 2007

(65) Prior Publication Data

US 2008/0245875 A1  Oct. 9, 2008

(51) Int. Cl.
  *G06Q 40/00* (2006.01)
  *G07D 11/00* (2006.01)
  *G06K 5/00* (2006.01)
(52) U.S. Cl. ...................................... 235/379; 235/380
(58) Field of Classification Search .................. 235/379, 235/380, 487, 492, 493; 705/39
See application file for complete search history.

(56) References Cited

U.S. PATENT DOCUMENTS

| | | | | |
|---|---|---|---|---|
| 3,273,704 A | * | 9/1966 | Rüdiger | 206/221 |
| 4,462,538 A | * | 7/1984 | Gendron | 229/68.1 |
| 5,383,598 A | * | 1/1995 | Styles | 239/57 |
| 5,556,026 A | * | 9/1996 | Blankitny | 229/123.1 |
| 5,769,213 A | | 6/1998 | Chatterton | |
| 6,053,321 A | * | 4/2000 | Kayser | 206/470 |
| 6,447,140 B1 | * | 9/2002 | Lu | 362/109 |
| 6,571,940 B2 | | 6/2003 | Newman | |
| 6,908,358 B2 | | 6/2005 | Lin | |
| 7,004,398 B1 | | 2/2006 | Francis et al. | |
| 7,024,807 B2 | | 4/2006 | Street | |
| 2002/0143697 A1 | | 10/2002 | Gotfried | |
| 2004/0249748 A1 | * | 12/2004 | Schultz et al. | 705/39 |
| 2005/0155618 A1 | | 7/2005 | Lafferty | |

(Continued)

FOREIGN PATENT DOCUMENTS

GB  2 277 482  11/1994

(Continued)

OTHER PUBLICATIONS

Specialty Bottle, Specialty Bottle website (http://specialtybottle.com/index.asp?PageAction=Custom&ID=39) as of Jun. 3, 2004; retrieved through Internet Archive Wayback Machine on Nov. 9, 2010 (http://web.archive.org/web/20040603000039/http://specialtybottle.com/index.asp?PageAction=Custom&ID=39).*
Color Copy of GiftCard with Backer Available at Target retail stores Dec. 26, 2004 (1page).

(Continued)

*Primary Examiner* — Thien M. Le
*Assistant Examiner* — Christopher Stanford
(74) *Attorney, Agent, or Firm* — Griffiths & Seaton PLLC

(57) ABSTRACT

A stored-value card includes an aromatic item, a housing, and an activation area. The housing substantially encloses the aromatic item, and the housing is configured to be selectively closed and opened to provide access to the aromatic item. The activation area links the housing to at least one of a stored-value account and a stored-value record such that value can be added to or deducted from the at least one of the stored-value account and the stored-value record using the activation area. Financial transaction cards, methods of encouraging purchase, and other embodiments are also disclosed.

18 Claims, 10 Drawing Sheets

U.S. PATENT DOCUMENTS

| | | | |
|---|---|---|---|
| 2006/0091202 A1* | 5/2006 | McInnis | 235/381 |
| 2006/0157554 A1 | 7/2006 | Halbur et al. | |
| 2006/0157555 A1 | 7/2006 | Halbur et al. | |
| 2006/0157556 A1 | 7/2006 | Halbur et al. | |
| 2006/0161439 A1 | 7/2006 | Selg et al. | |
| 2006/0208062 A1* | 9/2006 | Osborn et al. | 235/380 |
| 2006/0261170 A1* | 11/2006 | Mooney et al. | 235/486 |
| 2006/0283957 A1* | 12/2006 | Blumenfeld et al. | 235/487 |
| 2006/0289655 A1 | 12/2006 | Schultz et al. | |
| 2007/0023531 A1 | 2/2007 | Halbur et al. | |
| 2007/0051826 A1* | 3/2007 | Schofield | 239/60 |
| 2007/0187487 A1* | 8/2007 | Wilen | 235/380 |
| 2007/0194128 A1* | 8/2007 | Coe et al. | 235/486 |
| 2007/0251994 A1* | 11/2007 | Kingsborough et al. | 235/380 |
| 2008/0054077 A1 | 3/2008 | Zellner et al. | |

FOREIGN PATENT DOCUMENTS

| | | |
|---|---|---|
| GB | 2417709 A | 3/2006 |

OTHER PUBLICATIONS

Lindahl et al., "Stored-Value Card With Bubble Wand," U.S. Appl. No. 11/404,367, filed Apr. 14, 2006 (32 pgs.).

Halbur et al., "Stored-Value Card With Housed Object," U.S. Appl. No. 11/404,584, filed Apr. 14, 2006 (47 pgs.).

Birkland et al., "Stored-Value Card With Chemical Luminescence," U.S. Appl. No. 11/510,264, filed Aug. 25, 2006 (37 pgs.).

Halbur et al., "Inflatable Financial Transaction Product," U.S. Appl. No. 11/592,713, filed Nov. 3, 2006 (42 pgs.).

Halbur et al., "Financial Transaction Card Assembly With Packaged Product," U.S. Appl. No. 11/592,759, filed Nov. 3, 2006 (31 pgs.).

Smith et al., "Financial Transaction Product With Media Player," U.S. Appl. No. 11/604,016, filed Nov. 22, 2006 (51 pgs.).

"Stored-Value Card With Pedometer and Clip," U.S. Appl. No. 11/687,280, filed Mar. 16, 2007 (44 pgs.).

\* cited by examiner

STORED-VALUE PRODUCT WITH HOUSED ARTICLE

BACKGROUND OF THE INVENTION

Stored-value cards and other financial transaction cards come in many forms. A gift card, for example, is a type of stored-value card that includes pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally the gift card generally remains in the user's purse or wallet, serving as an advertisement or reminder to revisit the associated retailer. Gift cards and other stored-value cards provide a number of advantages to both the consumer and the retailer.

SUMMARY OF THE INVENTION

One aspect of the present invention relates to a stored-value card including an aromatic item, a housing, and an activation area. The housing substantially encloses the aromatic item, and the housing is configured to be selectively closed and opened to provide access to the aromatic item. The activation area links the housing to at least one of a stored-value account and a stored-value record such that value can be added to or deducted from the at least one of the stored-value account and the stored-value record using the activation area. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Figure 1:
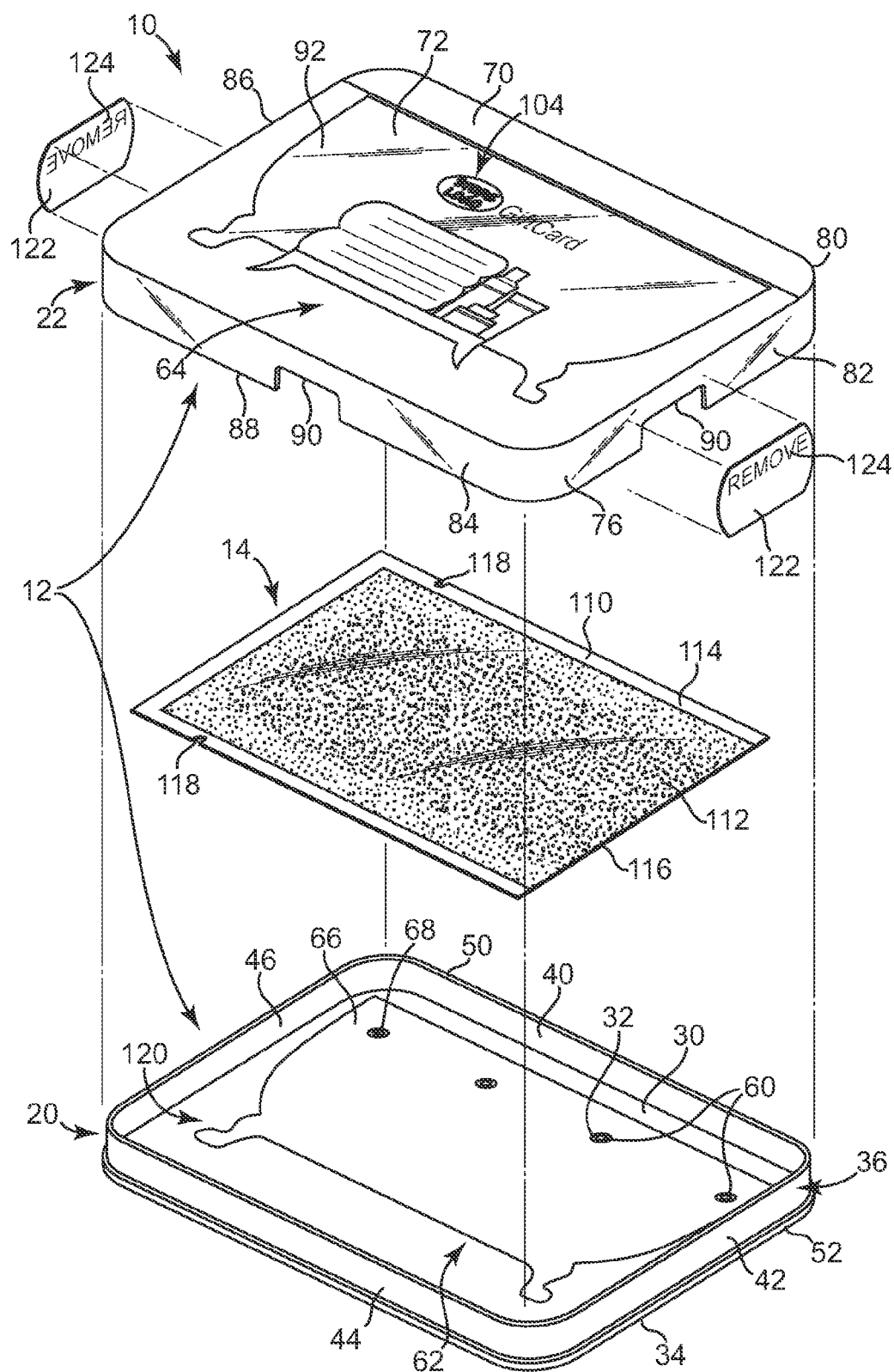
FIG. 1 is a exploded, top perspective view illustration of a stored-value product, according to one embodiment of the present invention.
Figure 2:
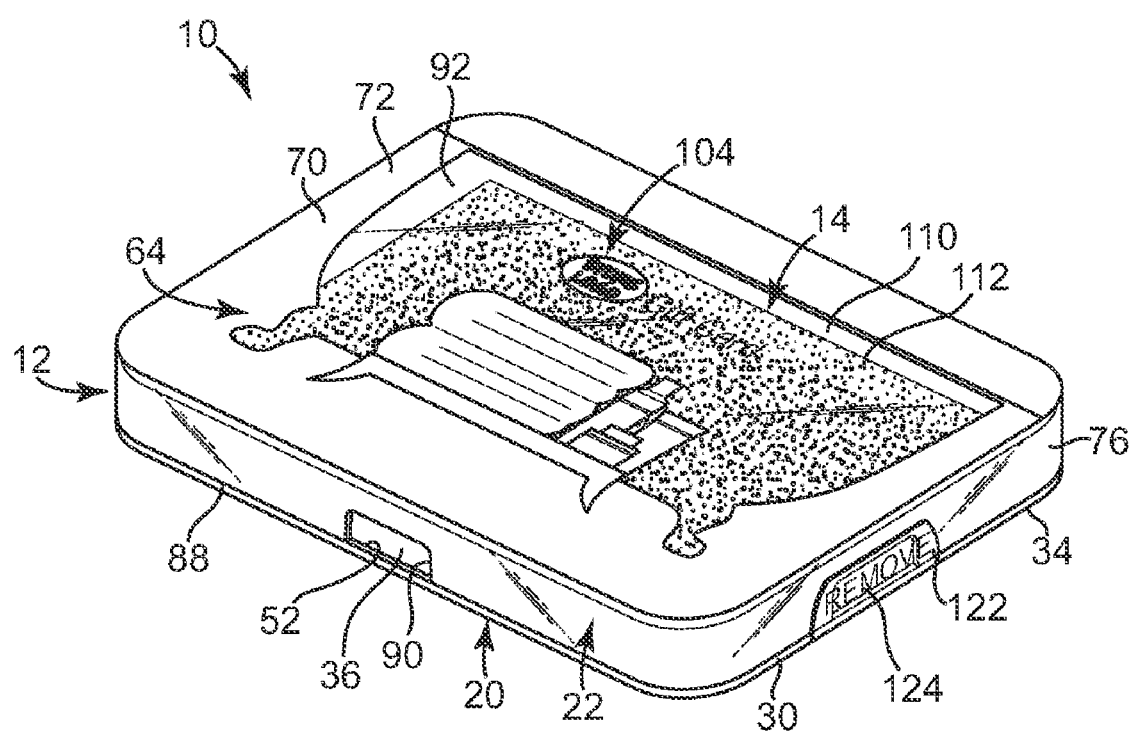
FIG. 2 is a top perspective view illustration of the stored-value product of FIG. 1, according to one embodiment of the present invention.
Figure 3:
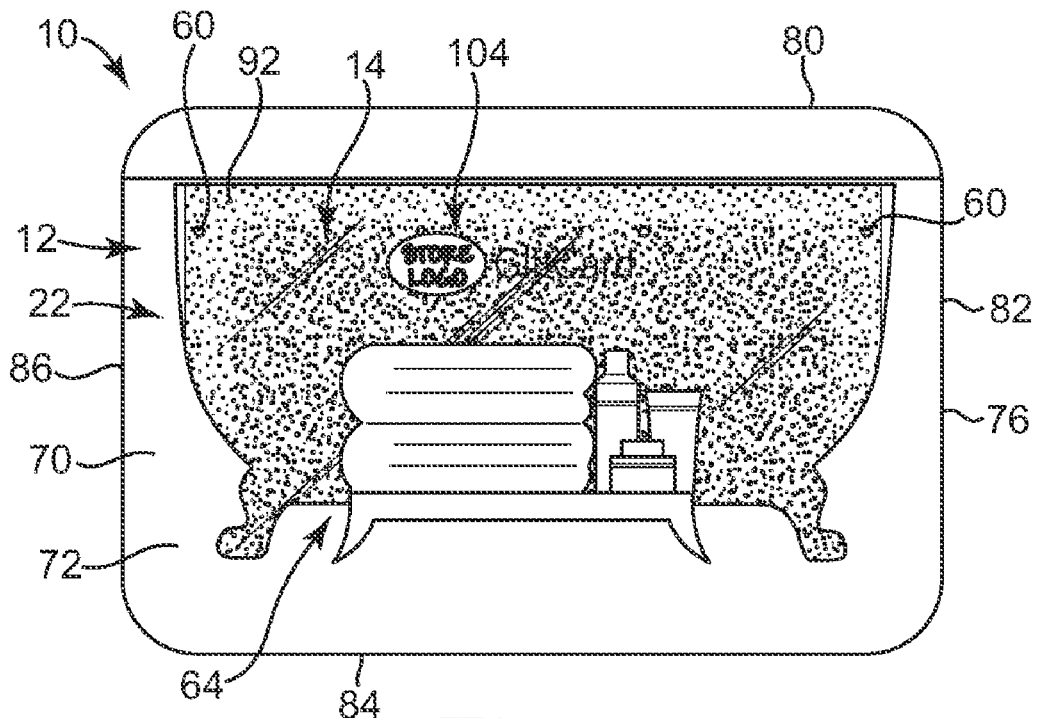
FIG. 3 is a top view illustration of the stored-value product of FIG. 1, according to one embodiment of the present invention.
Figure 4:
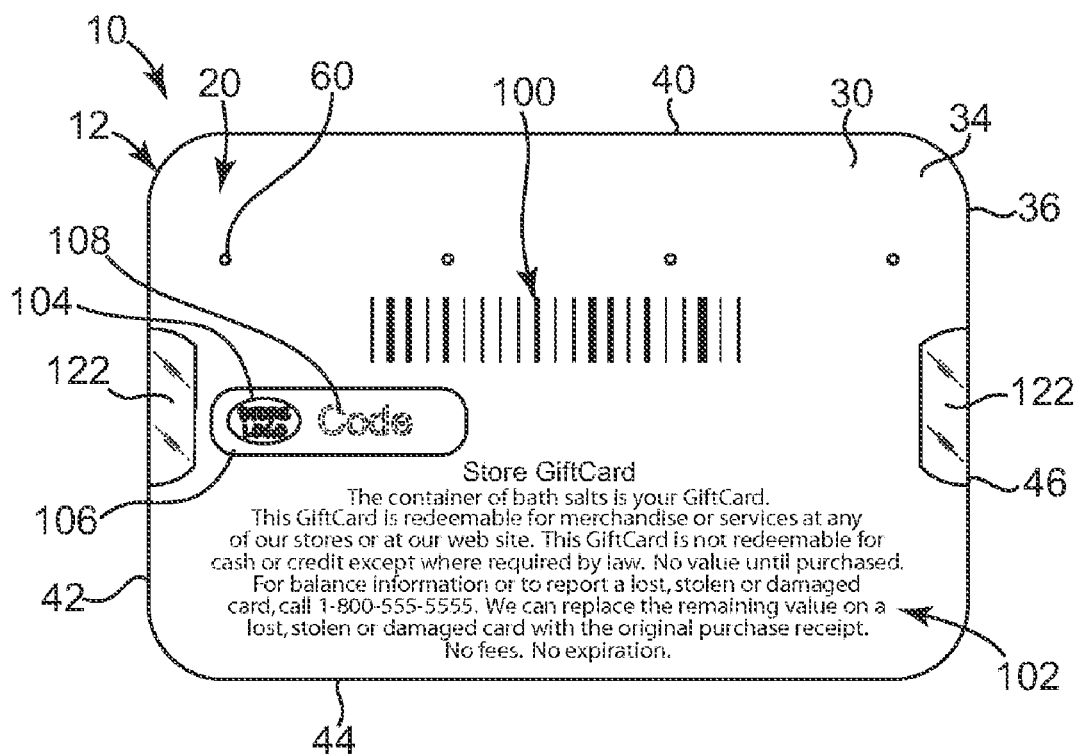
FIG. 4 is a rear view illustration of the stored-value product of FIG. 1, according to one embodiment of the present invention.

A stored-value product or financial transaction product, such as a gift card, is adapted for making purchases of goods and/or services at, for example, a retail store or web site. According to one embodiment, an original consumer buys a stored-value product to give a recipient who in turn is able to use it at a retail store or setting to pay for goods and/or services. In one embodiment, the gift card is a case that includes an aromatic article, such as a package of bath salts. The gift card may be coupled with a backer that is configured for use as a door hanger. For instance, in one example, the backer includes a punch out portion that, when removed from the remainder of the backer, defines a hole for receiving a door knob.

Turning to the figures, FIGS. 1-6 illustrate one embodiment of a stored-value product such as a stored-value card or financial transaction card according to the present invention as generally indicated at 10. In particular, referring to the exploded, perspective view of FIG. 1, in one embodiment, stored-value product 10 includes a housing 12 and an article or item 14 substantially enclosed or otherwise stored therein. Stored-value product 10, or more particularly, housing 12 is linked with a stored-value account or record and provides means for accessing the stored-value account to access monetary funds or non-monetary funds (e.g., prepaid calling minutes, points, etc.) associated therewith for paying for goods and/or services, for applying value toward calling minutes, for applying points toward a purchase, etc.

In one embodiment, housing 12 is substantially rigid and includes a first housing member or base 20 and a second housing member or cover 22. One embodiment of base 20 is illustrated, for example, in FIGS. 1 and 4. Base 20 generally includes a primary or a major panel 30, which, in one embodiment, is substantially planar and defines an inside surface 32 and an outside surface 34 (FIG. 4) opposite inside surface 32. In one embodiment, primary panel 30 is generally rectangular and sized similarly to an identification card, a credit card, or other card sized to fit in a wallet of a user. In other embodiments, primary panel 30 is otherwise shaped as a square, circle, oval, star, or any other suitable shape.

In one example, base 20 additionally includes a side wall 36 extending from inside surface 32 away from outside surface 34 and extending substantially about the entire perimeter of primary panel 30. In one embodiment, side wall 36 extends away from inside surface 32 with a substantially perpendicular orientation relative to primary panel 30. In one example, side wall 36 generally defines four substantially linear side wall segments 40, 42, 44, and 46. In particular, first side wall segment 40 extends substantially parallel to and is positioned opposite third side wall segment 44. Second side wall segment 42 and fourth side wall segment 46 each extend between first side wall segment 40 and third side wall segment 44 and are positioned opposite and substantially parallel to one another.

Side wall 36 extends from primary panel 30 to define an inside edge 50 opposite primary panel 30. In one embodiment, primary panel 30 radially extends outwardly beyond side wall 36, such that a lip 52 is defined by base 20 around a lower portion of side wall 36. In one embodiment, side wall 36 forms curved or chamfered corners at the intersection of each side wall segments 40, 42, 44, and 46 with another one of side wall segments 40, 42, 44, and 46.

In one embodiment, a plurality of apertures 60 (generally indicated in FIGS. 1 and 4) extend through primary panel 30. More particularly, each aperture 60 extends from outside surface 34 to and through inside surface 32. In one embodiment, where item 14 includes an aromatic item, each of the plurality apertures 60 is configured to permit a scent of the aromatic item to emanate through housing 12. As such, the plurality of apertures 60 are configured to provide a potential consumer with the ability to smell item 14 without removing item 14 from housing 12. As such, the plurality of apertures 60 are one example of means for facilitating aroma transfer through or emanation from housing 12.

In one embodiment, indicia are included on inside surface 32 to enhance the esthetic appeal of stored-value product 10, to provide identification of a brand associated with stored-value product 10, etc. For example, as illustrated in FIG. 1, indicia 62 include decorative graphics and/or text relating to item 14 and/or corresponding with indicia 64 included on cover 22, as will be further described below. In one example, indicia 62 are printed directly to base 20, while in another embodiment, indicia 62 are printed to a label or other member that is subsequently adhered to or otherwise applied to inside surface 32. In one example, where indicia 62 are included on a label 66 adhered to inside surface 32, label 66 includes a plurality of apertures 68 corresponding in a position to the plurality of apertures 60 of base 20 such that label 66 does not obstruct the plurality of apertures 60.

Figure 5:
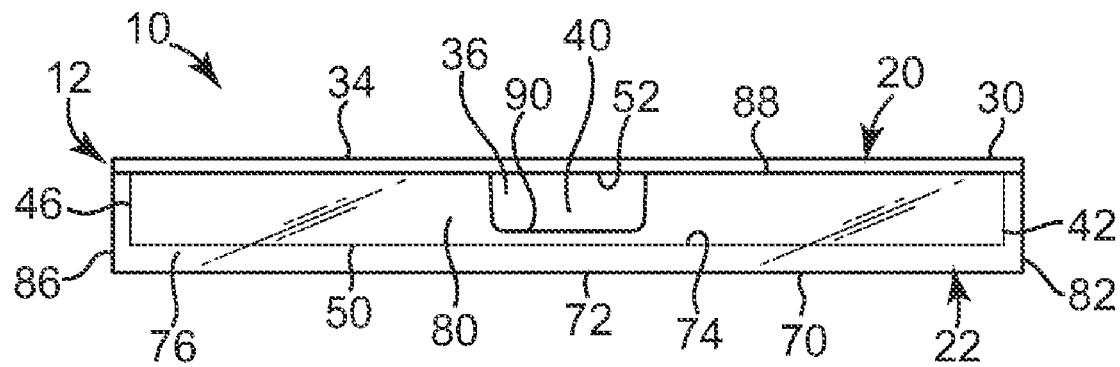
FIG. 5 is a top view illustration of the stored-value product of FIG. 1, according to one embodiment of the present invention.
Figure 6:
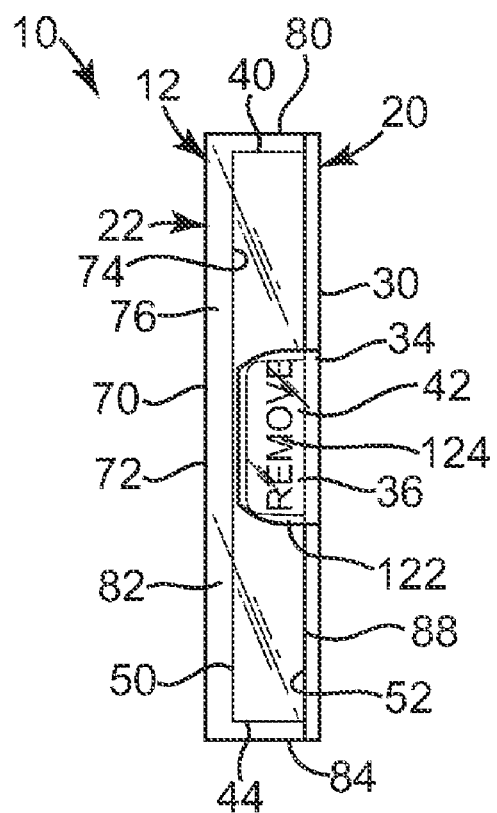
FIG. 6 is a right side view illustration of the stored-value product of FIG. 1, according to one embodiment of the present invention, where the left side view is a mirror image thereof.

In one embodiment, cover 22 includes a primary or a major panel 70, which, in one example, is substantially planar and defines an outside surface 72 and an inside surface 74 (e.g., as generally indicated in FIGS. 5 and 6) opposite outside surface 72. In one embodiment, major panel 70 is substantially sized and shaped similarly to major panel 30 of base 20.

Cover 22 additionally includes a side wall 76 extending from inside surface 74 of cover 22 away from outside surface 72 and extending substantially about the entire perimeter of major panel 70. In one embodiment, side wall 76 extends away from inside surface 74 with a substantially perpendicular orientation relative to major panel 70. In one example, side wall 76 generally defines four substantially linear side wall segments 80, 82, 84, and 86. In particular, first side wall segment 80 extends substantially parallel to and is positioned opposite third side wall segment 84. Second side wall segment 82 and fourth side wall segment 86 each extend between first side wall segment 80 and third side wall segment 84 and are positioned opposite and substantially parallel to one another.

In one example, side wall 76 extends from major panel 70 to define an inside edge 88 opposite major panel 70. In one embodiment, major panel 70 is sized similarly to major panel 30. However, side wall 76 extends about an outermost perimeter of major panel 70, while side wall 36 of base 20 extends from major panel 30 slightly inset from an outermost perimeter thereof to define lip 52 extending beyond side wall 36. As such, cover 22 is configured to fit around base 20. More particularly, base 20 and cover 22 interact such that major panel 70 and 30 are substantially parallel to one another and side wall 76 of cover 22 substantially wraps around side wall 36 of base 20 (i.e., extends around an outer perimeter of side wall 36). In one example, when assembled, inside edge 88 of cover 22 interfaces with major panel 30 of base 20, more particularly, with lip 52. As such, lip 52 functions as a stop to limit further movement of cover 22 onto base 20.

To facilitate subsequent removal of cover 22 from base 20, in one embodiment, side wall 76 of cover 22 additionally includes one or more cutouts or notches 90 extending from inside surface 88 toward major panel 70. In one example, each notch 90 is substantially rectangular in shape, and one notch 90 is formed and centered longitudinally along each of first, second, third, and fourth side wall segments 80, 82, 84, and 86. Notches 90 expose a portion of side wall 36 and, thereby, allow a user to more easily grasp base 20, more specifically lip 52 of base 20, to separate base 20 from cover 22. Other suitable manners of coupling base 20 and cover 22 are also contemplated and will be apparent to those with skill in the art upon reading the present application. For example, although cover 22 is primarily described herein as receiving and extending around base 20, in one embodiment, base 20 receives and extends around cover 22.

In one embodiment, each of base 20 and cover 22 is formed by injection molding of an acrylic, plastic, e.g., polyvinyl chloride (PVC), or any other suitable material to define the various attributes of base 20 and cover 22. Other methods of forming base 20 and cover 22 are also contemplated. In one example, base 20 and cover 22 are each formed of materials having a similar or identical color. In other examples base 20 and cover 22 can be formed of materials having different coloring. For example, in one embodiment, base 20 is formed of opaque material while cover 22 is transparent or translucent.

Housing 12 includes at least one activation area or account identifier 100 such as a bar code, a magnetic strip, a smart chip or other electronic device, a radio frequency identification device, or other suitable identifier readily machine readable by a point-of-sale terminal or other account access station or kiosk. In one embodiment, account identifier 100 is printed an outside surface 34 of base 20. Account identifier 100 indicates a stored-value account or record to which stored-value product 10 is linked. The account or record of the monetary or other value balance associated with stored-value product 10 optionally is maintained on a database, other electronic or manual record-keeping system or, in the case of "smart" cards for example, on a chip or other electronics or devices in or on stored-value product 10 itself. Accordingly, by scanning account identifier 100, an account or record linked to stored-value product 10 is identified and can subsequently be activated, have value amounts debited therefrom, and/or have value amounts added thereto. With the above in mind, account identifier 100 is one example of means for linking stored-value product 10 with the account or record.

In one embodiment, housing 12 additionally includes redemption indicia 102, which, in one example, are included on outside surface 34 base 20. Redemption indicia 102 indicate that stored value product 10 is redeemable for the purchase of goods and/or services and that, upon use, a value of the purchase goods and/or services will be deducted from the account or record linked to stored-value product 10. In one embodiment, redemption indicia 102 include phrases such as "<NAME OF STORE> GiftCard" and "This GiftCard is redeemable for merchandise or services at any of our stores or at our web site," and/or provides help or phone line information in case of a lost, stolen, or damaged stored-value product, etc.

In one embodiment, other indicia may also be included on outside surface 72 of cover 22 such as decorative indicia 64 and/or brand indicia 104, which identify a brand associated with stored-value product 10 such as identifying a product brand, a store brand, or other indicia readily associated with a product or store etc. In one embodiment, brand indicia 104 are also included on base 20. Decorative indicia 64 and brand indicia 104 may be applied to cover 22 in any suitable manner. In one example, where cover 22 is transparent or translucent, opaque decorative indicia 64 are formed on major panel 70 to mask at least a portion of major panel 70 such that only a portion thereof remains transparent or translucent. For example, as illustrated in FIG. 1, decorative indicia 64 mask off an entirety of major panel 70 other than an opening 92 generally in the shape of a bathtub, etc. As such, decorative indicia 64 provide for esthetic appeal of stored-value product 10 while still allowing a potential consumer, consumer, or other recipient to view the contents of housing 12 through the non-masked off portion of major panel 70. In this respect, a three-dimensional visual effect is provided as decorative indicia 64 of cover 22, item 14, and/or decorative indicia 62 of base 20 can be viewed simultaneously (where item 14 and indicia 62 are viewed through opening 92).

In one embodiment, housing 12 includes a scratch-off area 106 applied to an outside surface thereof covering an access code 108 such as numbers, characters, or other sequence configured to verify valid use of stored-value product 10. For example, in one embodiment, access code 108 is printed or otherwise applied to outside surface 34 of base 20, and scratch-off area 106 is applied over access code 108. In this manner, scratch-off area 106, which may be formed of any suitable material or layers of materials (as will be apparent to those of skill in the art upon reading the present application), selectively covers access code 108 to prevent unauthorized use of stored-value product 10. During activation or subsequent use of stored-value product 10, scratch-off area 106 can be easily removed or scratched off of housing 12 with a finger or other item to expose access code 108, which permits subsequent, valid use of stored-value product 10 towards the purchase of goods and/or services, or other similar use.

Item 14 is any suitable packaged or non-packaged item configured in size to be selectively received by and maintained within housing 12. In one example, item 14 includes a wrapper or other package 110 containing one or more objects 112. For example, package 110 is a flexible plastic wrapper containing objects 112 such as a plurality of commingled bath salt granules. More specifically, in one embodiment, package 110 includes heat sealed portions 114 extending around a substantial perimeter portion thereof to define a storage cavity 116 (generally indicated in FIG. 1) between two layers of plastic or other suitable material.

In order to facilitate a user in accessing objects 112 stored within package 110, in one embodiment, package 110 includes one or more notches 118 formed therein to facilitate opening of package 110. Notch 118 or other opening feature (e.g., perforation, slit, etc.) provides an area of weakness of package 110 allowing a user to rip or otherwise open package 110 without the use of tools. In addition to bath salt granules, other object(s) 112 are also contemplated. For example, objects 112 may include any granulized material, game pieces, consumable items (such as edible items, wearable items, etc.), novelty objects, etc. In one embodiment, item 14 does not include package 110 and the one or more objects 112 are directly placed within housing 12. Other examples of items 14 will be apparent to those skilled in the art upon reading the present application and will generally only be limited by the size of item 14 such that item 14 fits within housing 12, more particularly, between base 20 and cover 22.

With the above descriptions in mind and with reference to FIG. 1, cover 22 is configured to interface with and cover base 20 to define a storage cavity 120 therebetween. More specifically, cover 22 is configured to slidably interface with base 20 such that side wall 76 extends around side wall 36. Furthermore, in one embodiment, inside edge 88 of side wall 76 abuts lip 52 of base 20 and/or inside edge 50 of base 20 abuts inside surface 74 of major panel 70. In one embodiment, during assembly, item 14 is placed between base 20 and cover 22 prior to assembly thereof. As such, in order to allow base 20 and cover 22 to still be assembled in a suitable manner, item 14 is sized to fit entirely within storage cavity 120. In this manner, the outer perimeter of item 14 is at least slightly smaller than the inside dimensions of side wall 36 of base 20. Furthermore, item 14 has a thickness less than a height of side wall 36 (i.e. a distance between inside surface 32 and inside edge 50) or side wall 76 (i.e. a distance between inside surface 74 and inside edge 88). In one embodiment, assembled housing 12 has a total thickness (i.e., a distance between outer surfaces of the first major panel 30 and the second major panel 70) of greater than 1 mm.

In one example, upon assembly of housing 12 with item 14 stored therein, in one embodiment, one or more labels or stickers 122 are applied to and each extend over a portion of cover 22 and base 20. For example, as illustrated with reference to FIGS. 1, 2, 4, and 6, one sticker 122 is placed on each of second side wall segments 82 and extends downwardly and is wrapped about base 20 to interface with outside surface 34 of major panel 30. In one example, a second sticker 122 is applied to fourth side wall segment 86 and base 20. As such, stickers 122 secure base 20 with cover 22. In general, stickers 122 are easily removable, when desired, to release cover 22 from base 20 and allow access to item 14 maintained therebetween. In one example, each sticker 122 includes indicia 124 instructing a user or other bearer of stored-value product 10 to remove stickers 122 to access item 14. In one example, when stored-value product 10 is assembled, aperture 60 of base 20 or other portion of housing 12, permit a bearer of stored-value product 10 to experience the aroma or fragrance of item 14 through aperture 60 prior to removal of item 14 from housing 12. In this manner, aperture 60 function as scent release holes.

Figure 7:
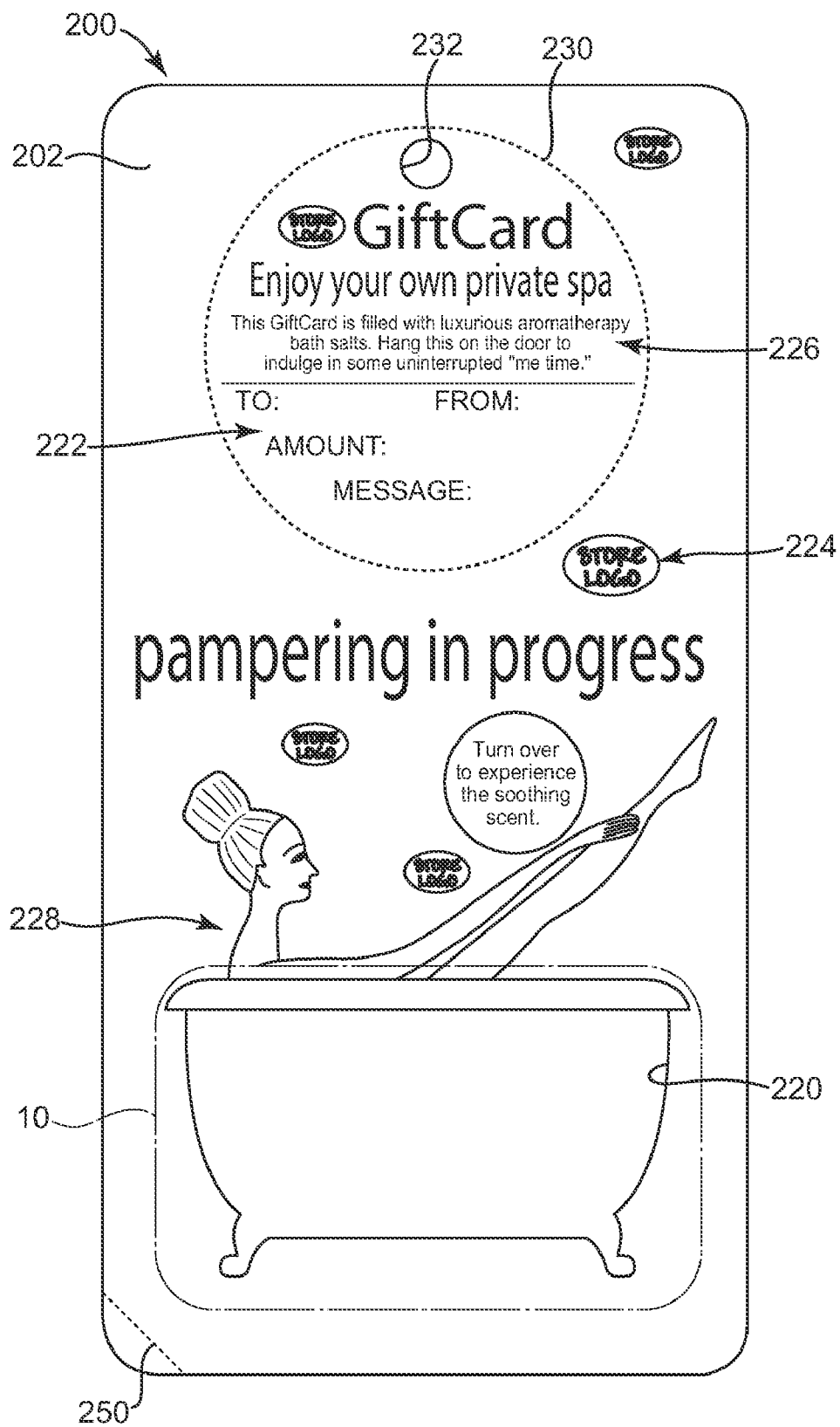
FIG. 7 is a front view illustration of one embodiment of a carrier for a stored-value product, according to one embodiment of the present invention.
Figure 8:
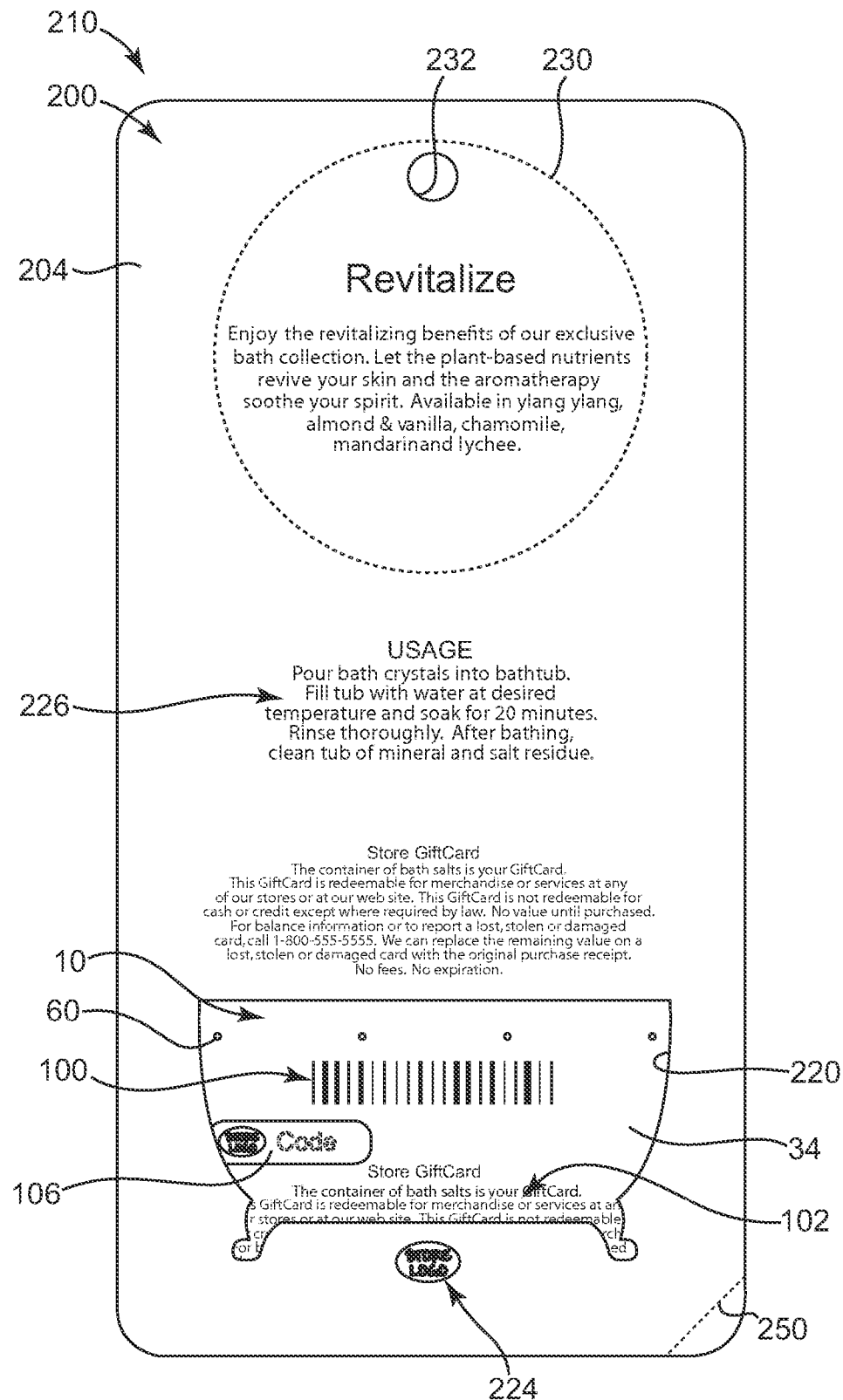
FIG. 8 is a back view illustration of a stored-value product assembly including the carrier of FIG. 7 with the stored-value product of FIG. 1, according to one embodiment of the present invention.
Figure 9:
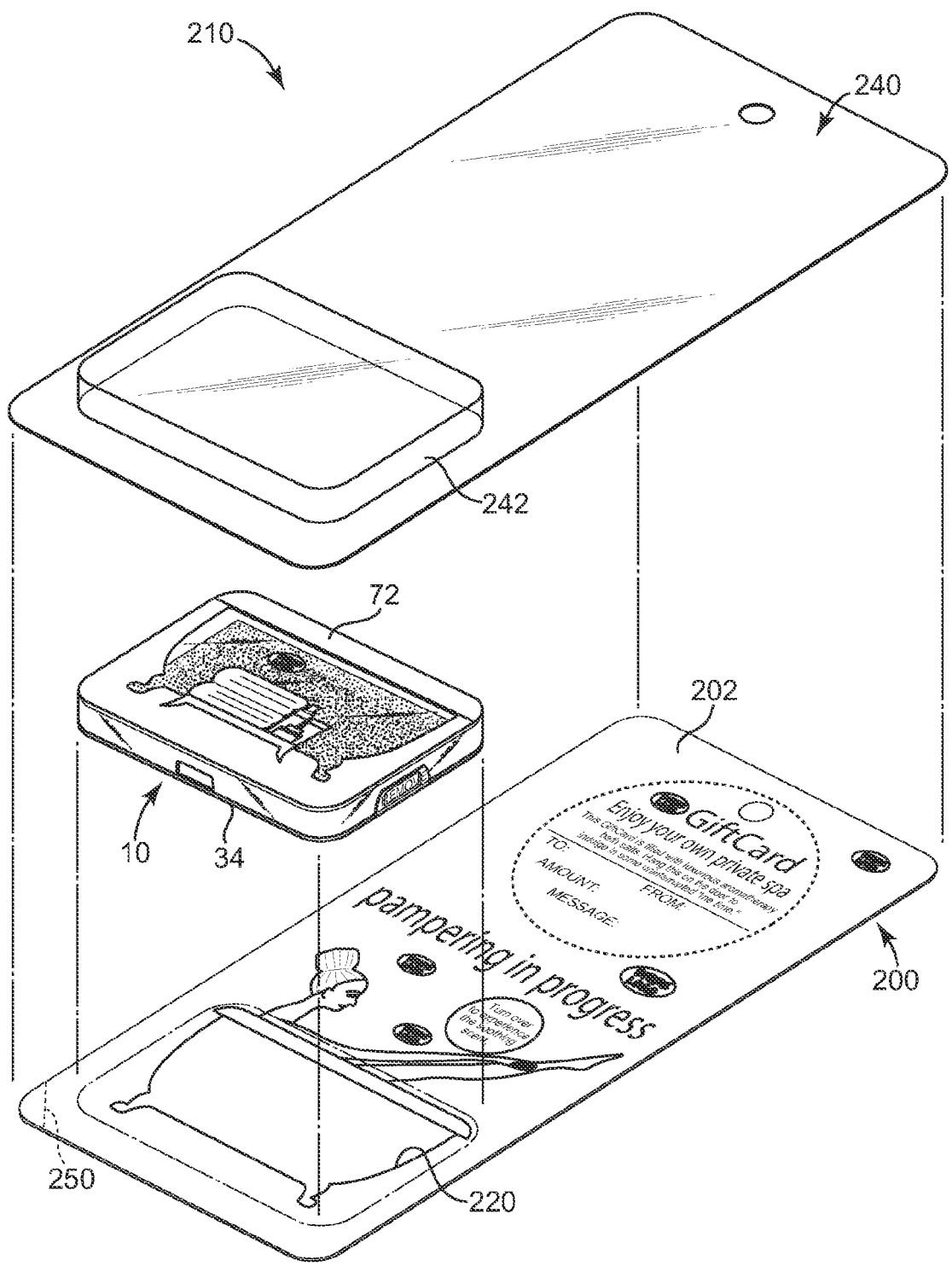
FIG. 9 is an exploded, top perspective view of the stored-value product assembly of FIG. 8, according to one embodiment of the present invention.

FIGS. 7 and 8 illustrate a carrier or backer 200 for supporting stored-value product 10. In one embodiment, backer 200 comprises a single layer or multiple layers of paper or plastic material, for example, generally in the form of a relatively stiff card. As such, backer 200 defines a front surface 202 and a rear surface 204 opposite front surface 202 stored-value product 10 (represented in dashed lines on front surface 202 in FIG. 7 for illustrated purposes so as not to obstruct backer 200) is readably releasably attached to backer 200, for example, by removable adhesive, skinning, or the like as will be further described below. Backer 200 and stored-value product 10 collectively define a stored-value product assembly 210 (FIGS. 8 and 9).

Backer 200 defines an opening or window 220 for displaying account identifier 100 of stored-value product 10 therethrough as illustrated in FIG. 8. As previously described, account identifier 100 is adapted for accessing the account or record associated with stored-value product 10 for activating, loading, or debiting values (e.g., monetary values, points, calling minutes, etc.) from the associated account or record. Accordingly, window 220 allows viewing or other access to account identifier 100 to activate and/or load stored-value product 10 without removing stored-value product 10 from backer 200.

In one embodiment, window 220 is formed of a sufficient size to also permit access to apertures 60 defined by housing 12. In this manner, even while stored-value product 10 is attached to backer 200, a potential consumer or other bearer of stored-value product 10 can smell item 14 in housing 12 through the plurality of apertures 60. In one embodiment, window 220 is formed of any suitable shape or size, such as a circle, square, or shaped similarly to an item corresponding with the particulars of stored-value product 10. For example, where item 14 includes bath salt objects 112 and/or where housing 12 depicts a bathtub with decorative indicia 64, window 220 is similarly formed as a bathtub or other related object. In one embodiment, where no window 220 is defined by backer 200 a portion of backer 200 is configured to be folded away from the remainder of backer 200 to access account identifier 100 without removing stored-value product 10 from backer 200.

Backer 200 displays indicia, graphics, or text information including one or more of store logo(s), store name(s), slogans, advertising, instructions, directions, brand indicia, promotional information, holiday indicia, seasonal indicia, media format identifiers, characters, and other information. For example, indicia 222 include "to," "from," "amount," and/or "message" fields. The fields of indicia 222 provide areas of backer 200 configured to be written upon by a consumer for personalization as a gift to a particular recipient, for a particular purpose, and/or to indicate a value of stored-value product 10.

Brand indicia 224 may also or alternatively be included to identify a store, brand, department, etc. and/or services associated with stored-value product 10. Instructional indicia 226 include detailed information regarding use of stored-value product 10 including identification of item 14 included within stored-value product 10, as well as directions for usage of item 14. For example, where item 14 includes bath salt objects 112, indicia 226 may state "Pour bath crystals in the bathtub. Fill tub with water at desired temperature and soak for 20 minutes. Rinse thoroughly. After bathing, clean tub of mineral and salt residue."

In one example, backer 200 also includes decorative indicia 228 configured to enhance the aesthetic appeal of backer 200 and, in one embodiment, relating to the nature of item 14. Any of indicia 62 (FIG. 1), 64 (FIGS. 1, 2, and 3), 222, 224, 226, 228, or other indicia optionally may appear anywhere on backer 200 or stored-value product 10. Additional information beside that specifically described and illustrated herein may also be included and/or one or more of indicia 62, 64, 222, 224, 226, and 228 may be eliminated.

In one embodiment, where backer 200 is sized similarly to a sign for hanging on a door handle etc., backer 200 includes a perforated circle 230. Perforated circle 230 is configured to permit removal of a portion of backer 200 enclosed within perforated circle 230 from a remainder of backer 200 to create a hole (not shown) in backer 200 configured to receiving a door handle or other suitable support apparatus, thereby permitting backer 200 to be hung from the door handle or other suitable support apparatus. In one embodiment, backer 200 additionally includes an aperture 232, or other means for facilitating display of stored-value product assembly 210 in a retail setting. For example, aperture 232 is sized to be hung or otherwise received on an arm of a display system such that the entirety of stored-value product assembly 210 can be hung therefrom. Other manners of configuring stored-value product assembly 210 for display in a retail setting will be apparent to those skilled in the art upon reading the present application.

As briefly described above, stored-value product 10 may be applied to backer 200 in any suitable manner. One example of a method of securing stored-value product 10 to backer 200 is illustrated with additional reference to FIG. 9. In particular, following placement of stored-value product 10 relative to backer 200, a skinning 240 is applied over and selectively adhered to backer 200 and stored-value product 10 thereby securing stored-value product 10 between backer 200 and skinning 240. Skinning 240 may be formed of any suitable material such as plastic, etc. and, in one embodiment, is one of transparent or translucent. In one embodiment, skinning 240 is substantially planar, but may, however, be formed with or be formed around stored-value product 10 so as to define a non-planar portion 242 defining a cavity to at least partially receive stored-value product 10.

In one embodiment, skinning 240 is applied to stored-value product assembly 210 in a relatively tight and secure manner such that skinning 240 is not generally discernable by a user who immediately views stored-value product assembly 210. Subsequently, a bearer of stored-value product assembly 210 wishing to remove stored-value product 10 from backer 200, can readily remove skinning 240 from backer 200 by peeling skinning 240 therefrom. In order to facilitate removal of skinning 240, in one example, backer 200 defines a perforated, scored, or other area 250 that can easily be removed from the remainder of backer 200. As such, a user can grasp and pull portion 250 of backer 200 as a handle for removing skinning 240 from the remainder of backer 200. Subsequently, skinning 240 can be discarded, backer 200 can be used as a door hanger, and/or the bearer can use stored-value product 10 as desired. Other methods of attaching stored-value product 10 to backer 200 will be apparent to those of skill in the art upon reading this application.

Figure 10:
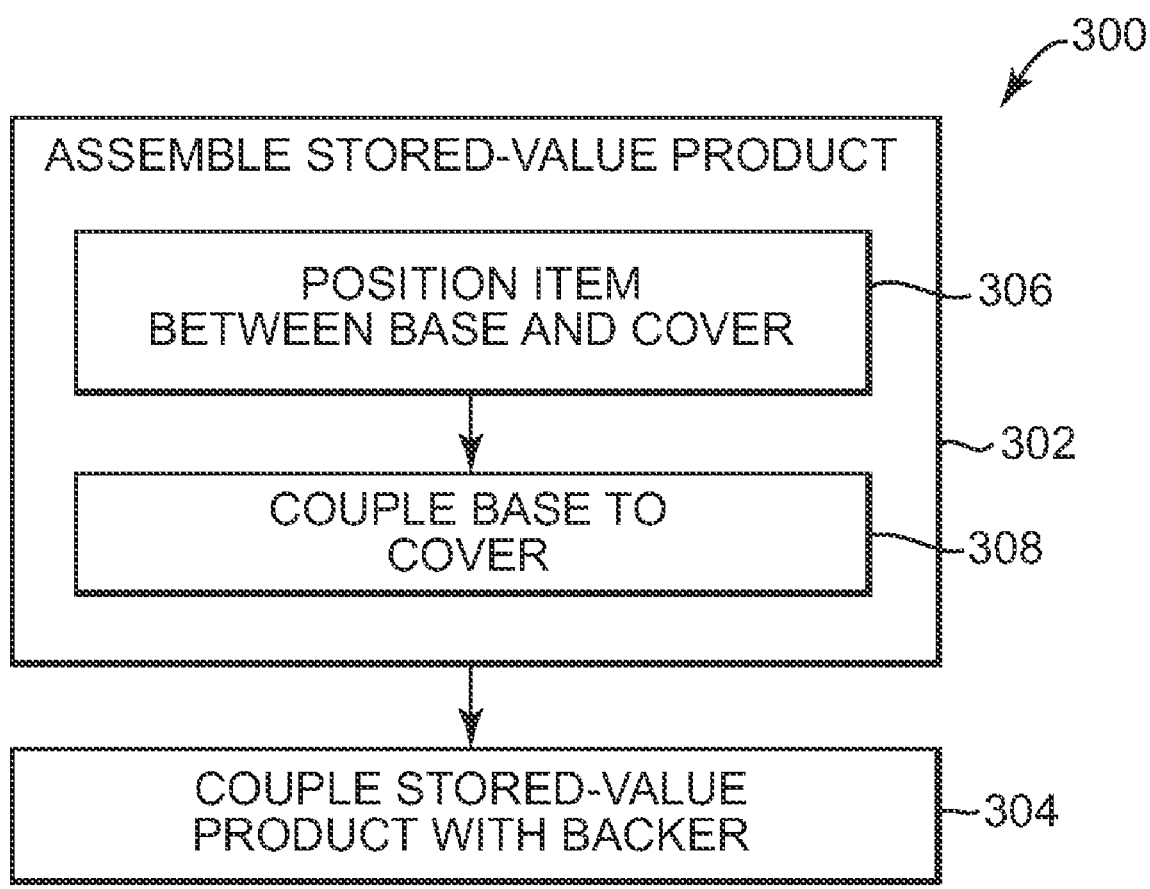
FIG. 10 is a flow chart illustrating a method of assembling a stored-value product, according to one embodiment of the present invention.

FIG. 10 is a flow chart illustrating one embodiment of a method 300 of assembling stored-value product 10 with backer 200. Additionally referring to FIG. 1, at 302, stored-value product 10 is assembled, and, at 304, stored-value product 10 is coupled with backer 200. More specifically, assembling stored-value product 10 at 302 includes positioning item 14 within storage cavity 120 defined by housing 12, for example, between base 20 and cover 22 at 306.

Subsequently, at 308, base 20 is coupled with cover 22. More specifically, cover 22 is positioned over base 20 such that major panels 30 and 70 are substantially parallel to one another and is slid over side wall 36 of base 20. As cover 22 is moved toward base 20, side wall 76 of cover 22 surrounds side wall 36. In one embodiment, when cover 22 is fully placed over base 20, inside edge 88 of cover 22 abuts or otherwise interfaces with lip 52 of base 20. As such, item 14 is housed between base 20 and cover 22. In one example, one or more stickers 122 are placed around a portion of housing 12 to interface with base 20 and cover 22 to secure cover 22 in place over base 20.

At 304, the assembled stored-value product 10 is coupled with backer 200 to form a stored-value product assembly 210 (FIGS. 8 and 9). In one example, stored-value product 10 is coupled to front surface 202 of backer 200 (e.g., with skinning 240 as described above with respect to FIG. 9 or in another selectively releasable manner). Once stored-value product 10 is coupled with backer 200, account identifier 100 of stored-value product 10 is viewable through opening 220 of backer 200 as illustrated in FIG. 8. Following assembly at 300, stored-value assembly 210 is ready for retail or other display for sale to potential consumers.

Figure 11:
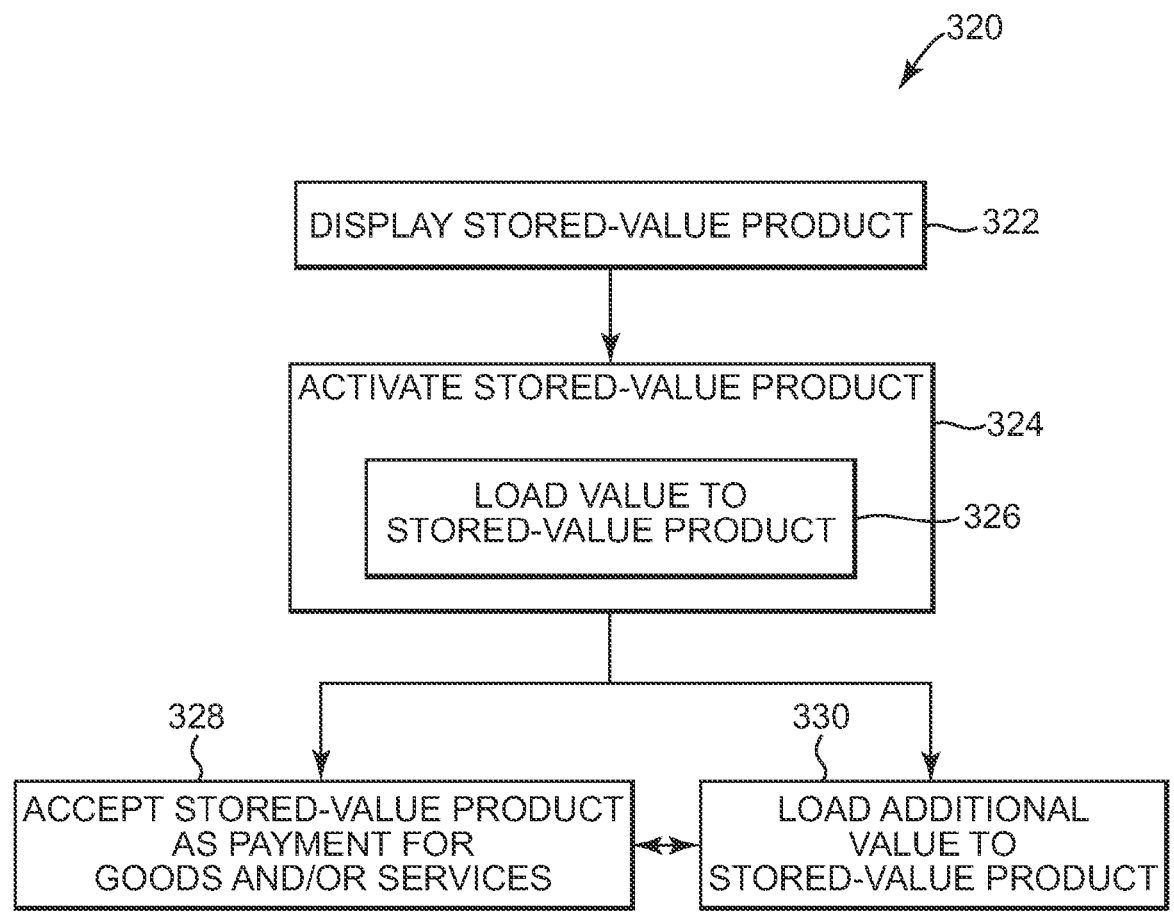
FIG. 11 is a flow chart illustrating a method of providing a stored-value product for sale to and for use by consumers, according to one embodiment of the present invention.

FIG. 11 is a flow chart illustrating one embodiment of a method 320 of providing stored-value product 10 for sale to and for use by consumers. At 322, stored-value product 10 is displayed to potential consumers. For example, stored-value product assembly 210, which includes stored-value product 10, is placed or hung from a rack, shelf, or similar device to display stored-value product assembly 210 in a retail setting such that stored-value product 10 is visible to potential consumers. In one embodiment, stored-value product 10 is displayed without backer 200 or a depiction of stored-value product 10 is placed on a web site for viewing and purchase by potential consumers.

At 324, a consumer, who has decided to purchase stored-value product 10, presents stored-value product assembly 210, or at least stored-value product 10, to a retail store employee, retail store kiosk, or other person or device to scan or otherwise read account identifier 100 of stored-value product 10 through opening 220 in backer 200 to access the account or record linked to account identifier 100. Upon accessing the account or record, value is added to the account or record at 326. Thus, stored-value product 10 is activated and loaded. In one embodiment, wherein a value is already associated with stored-value product 10, operation 326 may be eliminated and activating stored-value product 10 at 324 serves to unlock the account or record or otherwise make the predetermined value in the account or record available to a bearer of stored-value product 10.

Once stored-value product 10 is activated and/or loaded, stored-value product 10 can be used by the consumer or any other bearer of stored-value product 10 to purchase goods and/or services at the retail store or other affiliated retail setting or web site. In one embodiment, where stored-value product 10 is displayed on a web site at 322, then, at 324, stored-value product 10 may be activated in any suitable method and may be completed without physical scanning of account identifier 100. In one embodiment, stored-value product 10 is activated and/or loaded remotely via a telephone or the internet.

At 328, the retail store or other affiliated retail setting, web site, etc. accepts stored-value product 10 as payment towards the purchase of goods and/or services made by the current bearer of stored-value product 10. In particular, the value currently loaded on stored-value product 10 is applied toward the purchase of goods and/or services, toward the use of calling minutes, etc. At 330, additional value is optionally loaded on stored-value product 10 at a point-of-sale terminal, kiosk, other area of the retail store or related setting or via a web site or by telephone. Upon accepting stored-value product 10 as payment at 328, the retail store or related setting can subsequently perform either operation 328 again or operation 330 as requested by a current bearer of stored-value product 10. Similarly, upon loading additional value to stored-value product 10 at 330, the retail store or related setting can subsequently perform either operation 330 again or operation 328. In one example, the ability to accept stored-value product 10 as payment for goods and/or services is limited by whether the account or record associated with stored-value product 10 has any value at the time of attempted redemption.

Figure 12:
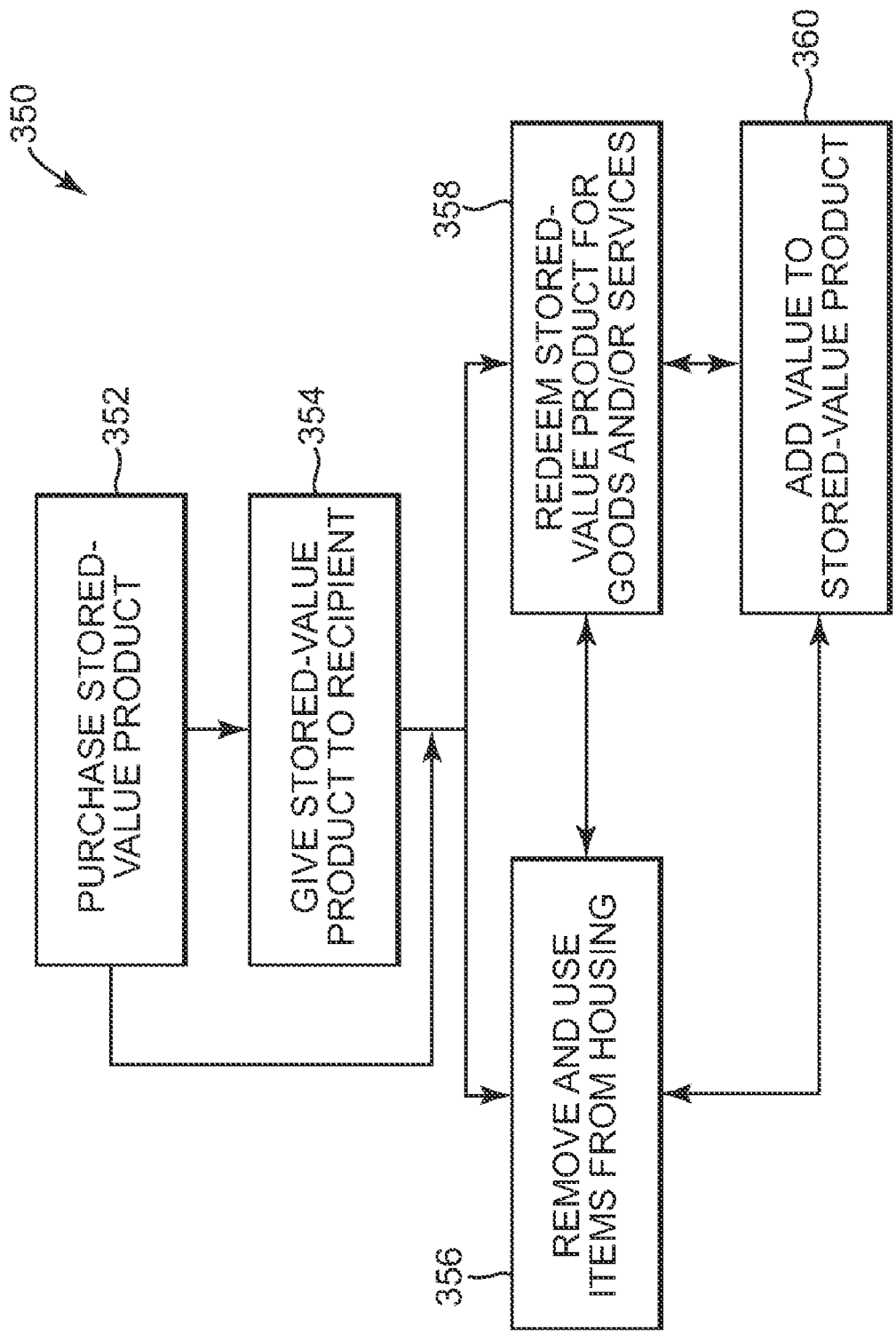
FIG. 12 is a flow chart illustrating a method of using a stored-value product, according to one embodiment of the present invention.

FIG. 12 is a flow chart illustrating one embodiment of a method 350 of using stored-value product 10. At 352, a potential consumer of stored-value product 10, which is displayed in a retail store or viewed on a web site, decides to and does purchase stored-value product 10 from the retail store or web site setting. Stored-value product 10 can be displayed and purchased alone or as part of the stored-value product assembly 210. Upon purchasing of stored-value product 10, a retail store employee, retail store kiosk, or other person scans account identifier 100 to activate or load value onto stored-value product 10. In one embodiment, such as where stored-value product 10 is purchased at 352 via a web site, actual scanning of account identifier 100 may be eliminated.

At 354, the consumer optionally gives stored-value product 10 to a recipient, such as a graduate, relative, friend, expectant parents, one having a recent or impending birthday, a couple having a recent or impending anniversary, etc. In one embodiment, a plurality of stored-value products 10 are purchased and given to party goers, such as at a birthday party, bridal shower, etc. as party favors or gifts. As an alternative, the consumer can keep stored-value product 10 for his or her own use thereby eliminating operation 354.

At 356, the consumer or recipient, whoever is in current ownership or otherwise is the current bearer of stored-value product 10, uses stored-value product 10 for reasons unrelated to its stored-value functionality. More specifically, the bearer initially removes stored-value product 10 from backer 200, if stored-value product 10 is coupled with backer 200. For example, the bearer may grasp tab portion 250 of backer 200 and pull skinning 240 off of backer 200 and stored-value product 10, thereby releasing stored-value product 10 from backer 200. Subsequently, the bearer opens housing 12 by separating cover 22 from base 20 to access storage cavity 120 and any item 14 maintained therein. The bearer can use item 14 as they see fit dependent upon the particular nature of item 14 or can otherwise use housing 12 as a storage device. In one example, where item 14 includes a bath salt object(s) 112 in package 110, item 14 can be removed from housing 12 and one or more of stored for future use and removed from package 110 and mixed with bath water to provide the bearer with a soothing, bath experience. At 356, the bearer may also use backer 200. For example, the bearer may form a hole in backer 200 by removing a portion thereof using perforated circle 230 and may hang backer 200 as a sign on a door handle or other suitable support device At 358, the current bearer of stored-value product 10 redeems stored-value product 10 for goods and/or services from the retail store or web site. At 360, the current bearer of stored-value product 10 optionally adds value to stored-value product 10, and more particularly, to the account or record associated with stored-value product 10, at the retail store, over the Internet, or via telephone. Upon removing and using item 14 of stored-value product 10 from housing 12 at 356, redeeming stored-value product 10 at 358, or adding value to stored-value product 10 at 360, the current bearer of stored-value product 10 subsequently can perform any of operations 356, 358, or 360 as desired. More specifically, since account identifier 100 and any other information necessary to redeem stored-value product 10 is included on housing 12, in one example, only housing 12 is used to perform operations 358 and 360 such that operations 358 and 360 can be performed regardless of whether item 14 is currently stored in housing 12. In one embodiment, the ability of the current bearer to repeat redeeming stored-value product 10 at 358 is limited by whether the account or record associated with stored-value product 10 has any value at the time of attempted redemption.

Although described above as occurring at single retail store or web site, in one embodiment, purchasing stored-value product 10 at 352, redeeming stored-value product 10 at 358, and adding value to stored-value product 10 at 360, can each be performed at any one of a number of stores adapted to accept stored-value product 10 or over the Internet. In one example, the number of stores are each a part of a chain or similarly branded stores. In one example, the number of stores includes at least one web site and/or at least one conventional brick and mortar store.

Stored-value cards and other stored-value products come in many forms, according to embodiments of the invention. The gift card, like other stored-value cards, can be "recharged" or "reloaded" at the direction of the original consumer, the gift recipient, or third party. The term "loading on" or "loaded on" herein should be interpreted to include adding to the balance of an account or record associated with a stored-value card. The balance associated with a stored-value card declines as the card is used, encouraging repeat visits. The card remains in the user's purse or wallet, serving as an advertisement or reminder to revisit the associated merchant. Gift cards, according to an embodiment of the invention, provide a number of advantages to both the consumer and the merchant. Other gift cards and stored-value cards according to embodiments of the invention include loyalty cards, merchandise return cards, electronic gift certificates, employee cards, frequency cards, pre-paid cards and other types of cards associated with or representing purchasing power or monetary value, for example.

Although the invention has been described to particular embodiments, such embodiments are for illustrative purposes only and should not be considered to limit the invention. Various alternatives and changes will be apparent to those with ordinary skills in the art. Other modifications within the scope of the invention in its vary embodiments will be apparent of ordinary skill.

What is claimed is:

1. A stored-value product comprising:
    a first housing member defining a first major panel and a first side wall extending from the first major panel, the first housing member defining an exposed, external surface;
    a second housing member defining a second major panel and a second side wall, wherein the first housing member and the second housing member are coupled together such that the second side wall extends around an outermost perimeter of the first side wall to form a storage cavity between the first major panel, the second major panel, and the first side wall;
    an account identifier formed on the exposed, external surface of the first housing member, the account identifier linking the stored-value product to at least one of an account and a record, the account identifier being machine readable by a point-of-sale terminal such that value can be added to or deducted from the at least one of the account and the record using the account identifier; and
    an item stored within the storage cavity and being at least partially removable from the storage cavity when the first housing member is uncoupled from the second housing member wherein the item includes a package containing one or more objects and the one or more objects includes bath salt granules.

2. The stored-value product of claim 1, wherein the account identifier includes a bar code.

3. The stored-value product of claim 1, wherein the account identifier includes at least one of a bar code, a magnetic strip, an electronic device, and a radio frequency identification device.

4. The stored-value product of claim 1, wherein at least one of the first housing member and the second housing member includes a portion that is one of transparent and translucent such that the item can be viewed without removing the item from the storage cavity.

5. The stored-value product of claim 1, wherein the first housing member defines a lip extending radially beyond and about a substantial entirety of the outer perimeter of the first side wall, the lip defines a top surface facing the second housing member, the second side wall defines an edge opposite the second major panel, and wherein the edge abuts the top surface of the lip when the first housing member is coupled with the second housing member.

6. The stored-value product of claim 1, wherein the first side wall extends substantially perpendicularly from the first major panel.

7. The stored-value product of claim 1, wherein the first major panel defines a plurality of apertures extending through the first major panel.

8. The stored-value product of claim 1, wherein the second side wall defines an inside edge opposite the second major panel and includes at least one notch extending from the inside edge toward the second major panel, and wherein a portion of the first side wall is exposed through the notch.

9. The stored-value product of claim 1, further comprising at least one sticker coupled with each of the first housing member and the second housing member to hold the first housing member in place relative to the second housing member.

10. The stored-value product of claim 1, wherein:
    the first housing member and the second housing member are formed separately from one another and are configured to be repeatedly coupled to and uncoupled from one another, and
    the first housing member and the second housing member are entirely separated from one another when the first housing member and the second housing member are uncoupled from one another.

11. The stored-value product of claim 1, wherein the second side wall substantially entirely covers the first side wall when the first housing member is coupled to the second housing member.

12. The stored-value product of claim 11, wherein:
    the first housing member defines a lip radially extending outwardly from the first side wall in a manner coplanar with the first major panel,
    the lip defines a top surface facing the second housing member,
    the second side wall defines an edge opposite the second major panel, and
    the edge of the second side wall mates with the top surface of the lip around a substantial entirety of the outer perimeter of the first side wall.

13. The stored-value product of claim 1, in combination with a database remote from the stored-value product, wherein the database stores the at least one of the account and the record and a value associated with the at least one of the account and the record and available toward a purchase of one or more of goods and services, and the account identifier links the stored-value product to the at least one of the account and the record stored by the database.

14. A stored-value card comprising:
    an aromatic item, wherein the aromatic item includes bath salts;
    a housing substantially enclosing the aromatic item, wherein the housing is configured to be selectively closed and opened to provide access to the aromatic item; and
    an activation area formed on the housing linking the housing to at least one of a stored-value account and a stored-value record such that value can be added to or deducted from the at least one of the stored-value account and the stored-value record using the activation area.

15. The stored-value card of claim 14, wherein the aromatic item includes a wrapper containing one or more aromatic objects.

16. The stored-value card of claim 14, wherein the housing includes one or more scent holes configured to permit a scent of the aromatic item to emanate through the housing.

17. The stored-value card of claim 14, wherein the housing is substantially rigid.

18. The stored-value card of claim 14, wherein the housing includes a first member and a second member selectively coupled to one another to selectively enclose the aromatic item between the first member and the second member.

* * * * *